ES Patent Office 3,313,746
Patented Apr. 11, 1967

3,313,746
EXPANDED, FOAMED POLYVINYLCARBAZOLE
Leo Philipp Ellinger, London, England, assignor to The British Oxygen Company Limited, London, England, a British company
No Drawing. Filed Apr. 15, 1963, Ser. No. 272,859
Claims priority, application Great Britain, May 10, 1962, 17,966/62
5 Claims. (Cl. 260—2.5)

This invention relates to expanded foamed polyvinylcarbazole and more particularly to a method of making mouldings therefrom.

Polyvinylcarbazole is known to have useful electrical properties and remains unaffected at temperatures much higher than is the case with the polymers usually used in electrical applications.

It is an object of the present invention to provide a method of making mouldings of expanded foamed polyvinylcarbazole which is extremely easy to carry out and by which mouldings may be made over a range of densities from 40 pounds per cubic foot down to as little as 2 pounds per cubic foot.

According to the present invention, a method of making mouldings of expanded foamed polyvinylcarbazole includes the steps of impregnating granules of polyvinylcarbazole by immersing them in a mixture containing at least one volatile solvent for the polyvinylcarbazole and at least one diluent which is inert towards polyvinylcarbazole but is miscible with and more volatile than the solvent or solvents, heating the impregnated granules at a temperature sufficient to drive off substantially all the inert diluent or diluents whilst leaving a substantial amount of the solvent or solvents, and subsequently subjecting the granules to a moulding operation at an elevated temperature sufficient to drive off the solvent or solvents.

The volatile solvents used in the present invention are liquids which dissolve the polymer and which after impregnation of the polymer will ensure expansion on heating so that satisfactory expanded mouldings are obtained. The diluents are liquids which do not dissolve the polymer and which are miscible with the volatile solvent or solvents used but are appreciably more volatile and may therefore be removed by drying at a temperature at which the greater part of the solvent remains.

The initial granules of polyvinylcarbazole are preferably prepared by the emulsion polymerisation of the monomer. In a preferred method of carrying out the emulsion polymerisation, the monomer is added to water containing a dispersing agent or protective colloid, the monomer being added either as a powered solid, or if the temperature of the water is above the melting point of the monomer, as liquid. An initiator of the free radical type such as azobisisobutyronitrile is added, together with a peroxide such as di-tertiary butyl peroxide. The occurrence of polymerisation is shown by a sudden rise in temperature. The white granular solid obtained on cooling is filtered and washed with acetone to remove the unchanged monomer.

Suitable dispersing agents for use in this polymerisation procedure are polyvinyl alcohol, polyethylene glycol mono-laurate, polyethylene glycol monoleate, polyethylene glycol mono-stearate and the like.

Examples of initiators which have been found useful are azobisisobutyronitrile and ethyl azobisisobutyrate.

Although it is preferred to carry out the emulsion polymerisation in an aqueous medium, since this is the most convenient and inexpensive vehicle, other dispersion media may be used, such as ethylene glycol or propylene glycol.

The impregnation of the polyvinylcarbazole granules is carried out by bringing the granules into contact with a mixture of the solvent or solvents and the inert diluent or diluents, if desired, for at least part of the time, under reduced pressure. After the impregnation is complete, the granules are dried at a temperature sufficiently high to drive off the inert diluent while still leaving a substantial amount of the solvent in the granules. For example, if the solvent used is benzene and the inert diluent is acetone, the drying operation may be carried out at a temperature of 60° C., which results in substantially all the acetone being driven off while most of the benzene is still retained by the granules. The granules are then charged into a lightly loaded mould and heated to a suitable moulding temperature which is sufficiently high to drive off the solvent or solvents. A suitable temperature is in the range of 200° to 250° C.

The granules will usually be impregnated directly after their production by suspension polymerisation, but, if desired, they may be pre-expanded by heating for a short time at a temperature in the region of 200° to 250° C., and after cooling impregnated as previously described.

Solvents which may be used in the process of the present invention include benzene, dioxan, tetrahydrofuran, dimethylformamide and pyridine, but not all liquids which dissolve polyvinylcarbazole are equally effective in achieving cohesion of the expanded granules. The preferred solvents are benzene and dioxan.

The preferred inert diluent is acetone.

Mixtures of two or more solvents may be used, and mixtures of two or more inert diluents. Moreover, other substances may be added to the mixture of solvent and inert diluent. For example, very good results have been obtained by the addition of azobisisobutyronitrile to the mixture of solvent and inert diluent.

The time required to impregnate the granules is between 15 minutes and 18 hours, depending on the nature of the solvent and diluent used, the resulting concentrations and the degree of expansion required.

By the use of suitably shaped moulds it is possible to obtain discs, rods, blocks or other shapes, the granules expanding and cohering so as to fill the mould and produce a uniform strong light material. By the use of the process of the present invention, mouldings may be prepared in which the cohesion of the expanded granules is consistently excellent. The process of the present invention is particularly suitable for the production of blocks of considerable thickness and blocks twelve inches square and two or three inches thick have been prepared. By varying the conditions of emulsion polymerisation, impregnation and moulding, a range of bulk densities can be obtained from 40 pounds per cubic foot down to 2 pounds per cubic foot, but the invention is not limited to this range of densities. The moulding materials have adequate mechanical strength for handling and can be cut, sawn, milled, drilled and accurately finished to size. They will also take a fairly smooth finish. Even material of the lowest bulk density has proved remarkably handleable, although naturally it is not as strong as the materials of higher bulk density.

The resistance of the expanded polymer is similar to that of the block polymer, for example, the expanded material is stable for several hours at a temperature of 200° C. in air. The solvent resistance of the expanded material is of a high order, and it is particularly noticeable that the material is resistant to such common solvents as acetone, alcohol and aliphatic hydrocarbons.

The invention is illustrated by the following examples:

EXAMPLE 1

200 grams of vinylcarbazole were polymerised in aqueous dispersion in the presence of azobisisobutyronitrile and di-tertiary butyl peroxide. The resulting polymer granules were extracted with acetone to remove unchanged monomer, and dried at 80° C.

The granules were impregnated with benzene in accordance with the invention. The granules were added to a mixture of 120 millilitres of benzene and 280 millilitres of acetone and allowed to remain under a vacuum until impregnation had taken place. After this, the granules were filtered off and allowed to dry at 60° C. for three hours. Some of the granules were then charged into a lightly loaded mould and were moulded at 250° C. for two minutes. A hard fibrous coherent uniform disc was obtained having excellent cohesion between the individual expanded grains. The moulded material was found to have excellent mechanical and electrical properties.

EXAMPLE 2

500 g. of polyvinylcarbazole granules, obtained by polymerisation, extracted and dried as in Example 1, were added to 1 litre of a mixture 25 vol. percent dioxan in acetone containing 3% w./v. of azobisisobutyronitrile in solution. While the granules were submerged in this mixture, the impregnation vessel was evacuated to a pressure of 6 mm. Hg. After 5 minutes at this pressure, air was re-admitted to the evacuation vessel and the granules were left in the impregnation mixture for a total time of 18 hours. The granules were then filtered from the mixture and dried at 80° C. in a stream of air until their weight was 535 g. The granules were then moulded as in Example 1, and a hard, fibrous, uniform disc was obtained having excellent coherence between the individual grains.

What I claim as my invention and desire to secure by Letters Patent of the United States is:

1. A method of making mouldings of expanded foamed polyvinyl carbazole comprising the steps of impregnating granules of polyvinyl carbazole by immersing them in a mixture containing acetone as a diluent and a solvent selected from the group consisting of benzene, dioxan, tetrahydrofuran, dimethyl formamide, pyridine, and mixtures of these substances, heating the impregnated granules at a temperature sufficient to drive off substantially all said diluent whilst leaving a substantial amount of said solvent and subsequently subjecting the granules to a moulding operation at an elevated temperature sufficient to drive off said residual amount of said solvent.

2. A method according to claim 1, wherein the impregnation of said granules with the solvent-diluent mixture is carried out for at least a part of the total impregnation time under vacuum.

3. A method according to claim 1, wherein the said granules are pre-expanded prior to impregnation by heating to 200–250° C. for a short time.

4. A method according to claim 1, wherein azobisisobutyronitrile is added to the solvent-diluent mixture.

5. A method according to claim 1, wherein said solvent is benzene.

References Cited by the Examiner

UNITED STATES PATENTS

| | | | |
|---|---|---|---|
| 2,893,963 | 7/1959 | Cleland et al. | 260—2.5 |
| 2,950,261 | 8/1960 | Buchholz et al. | 260—2.5 |
| 3,018,257 | 1/1962 | Spencer | 260—2.5 |
| 3,085,073 | 4/1963 | Lintner et al. | 260—2.5 |
| 3,117,941 | 1/1964 | Knobloch et al. | 260—2.5 |

OTHER REFERENCES

Schildknecht, "Vinyl and Related Polymers," Wiley and Sons, New York, 1952, pp. 44 and 655.

MURRAY TILLMAN, *Primary Examiner.*

GEORGE F. LESMES, N. F. OBLON,
*Assistant Examiners.*